Oct. 19, 1937.  C. J. RANDALL  2,096,338
METHOD AND APPARATUS FOR BLOWING SPONGE RUBBER
Filed Feb. 6, 1935  4 Sheets-Sheet 1
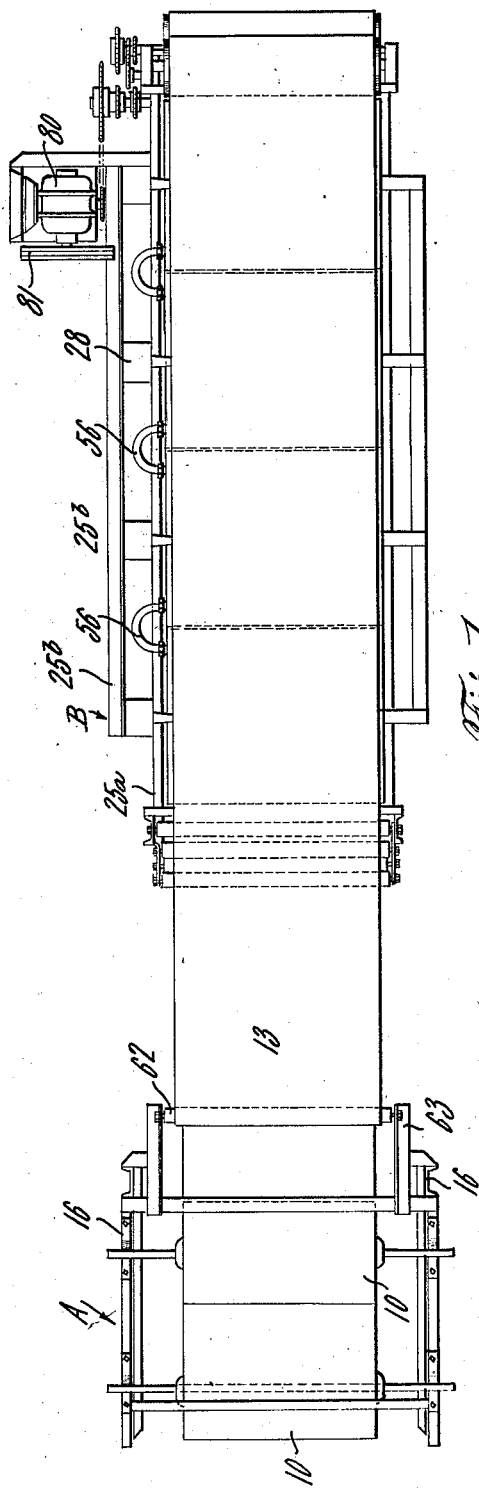
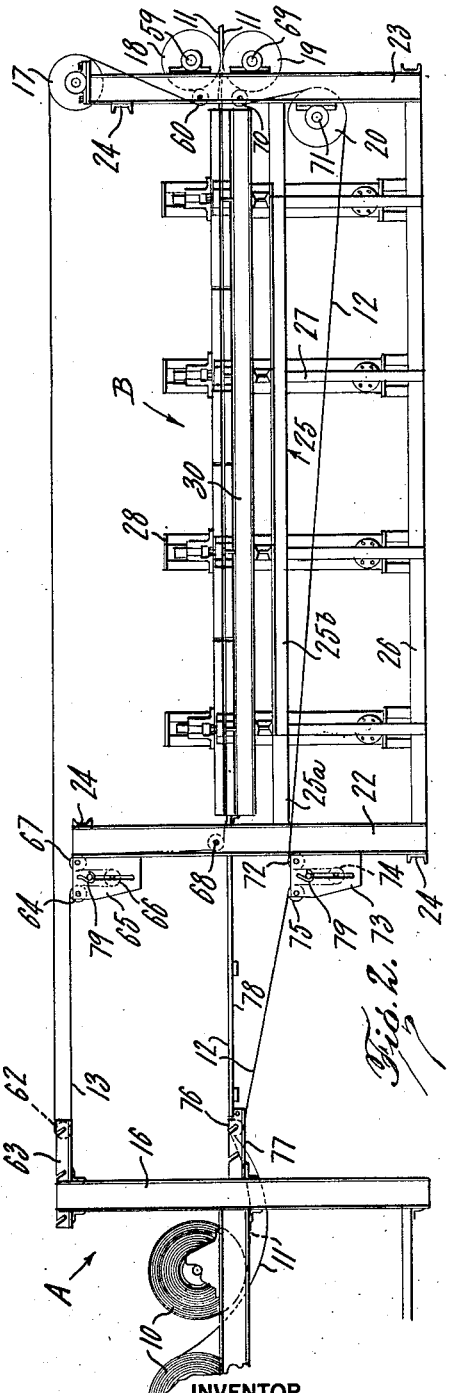
INVENTOR
CHESTER J. RANDALL
BY
ATTORNEY

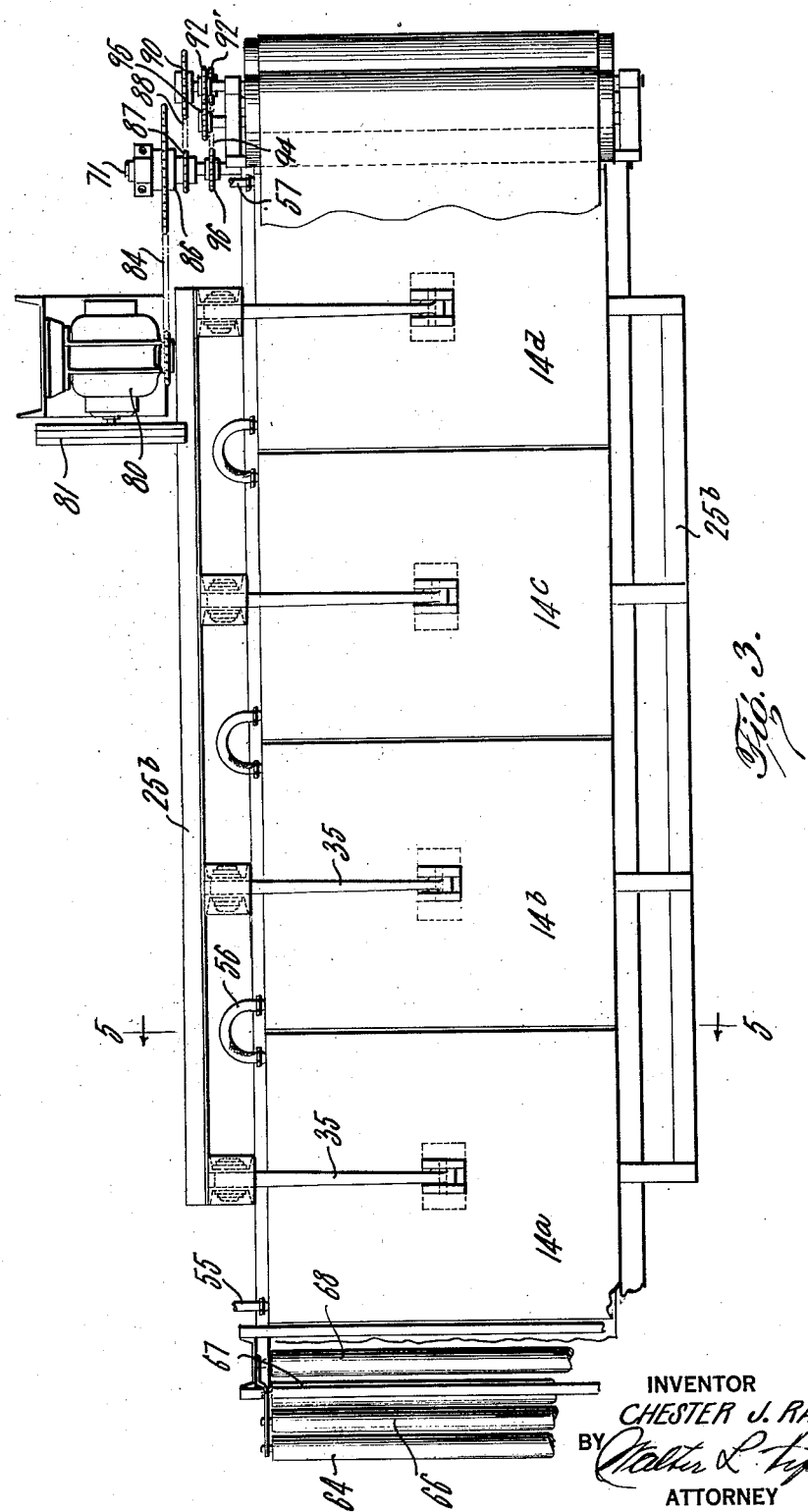

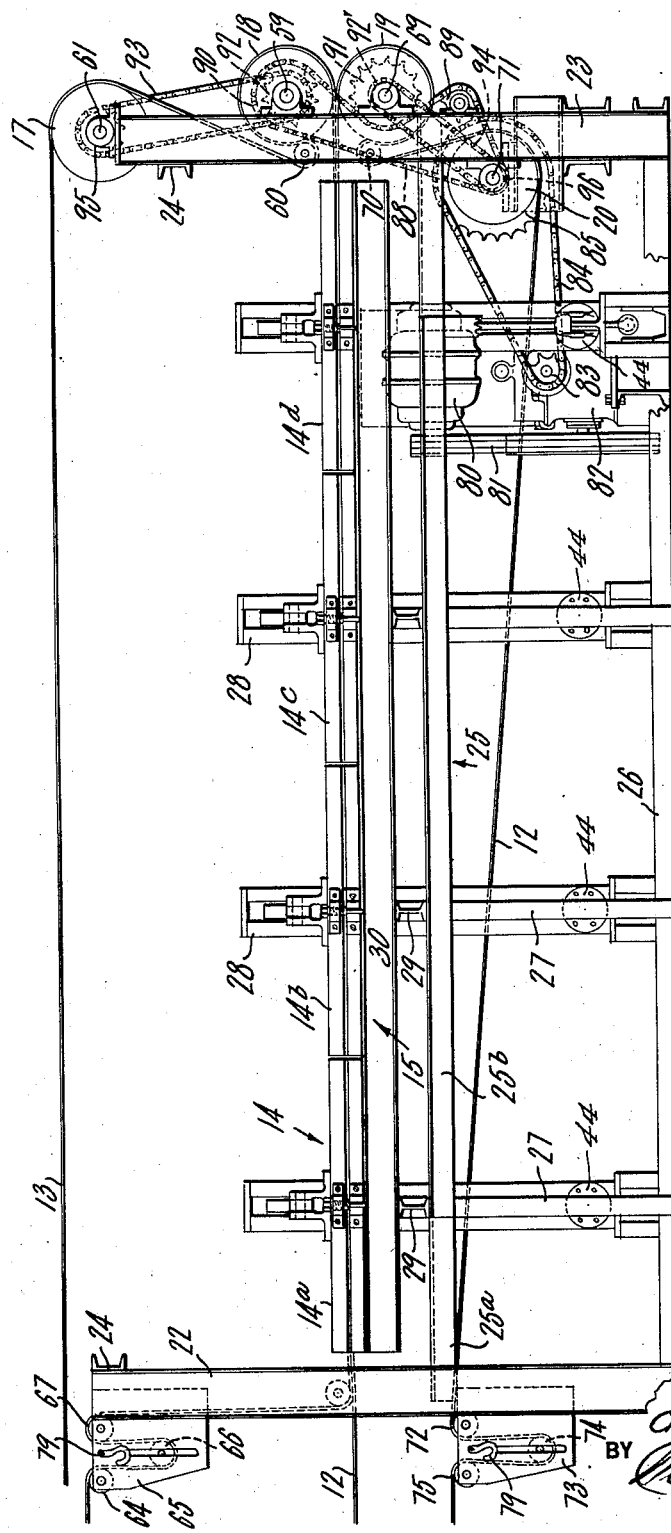

Oct. 19, 1937.    C. J. RANDALL    2,096,338
METHOD AND APPARATUS FOR BLOWING SPONGE RUBBER
Filed Feb. 6, 1935    4 Sheets-Sheet 4
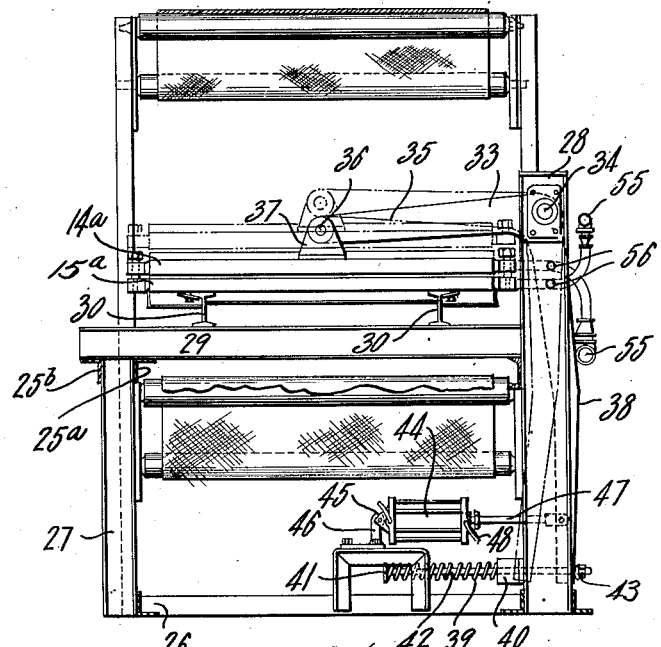
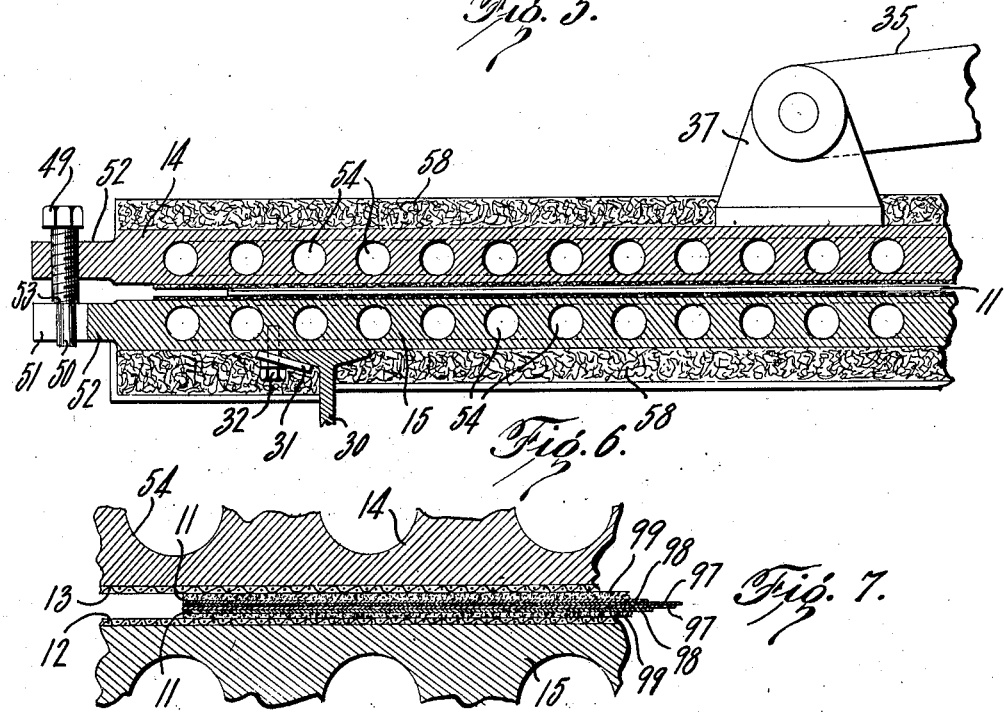
INVENTOR
CHESTER J. RANDALL
BY
ATTORNEY Patented Oct. 19, 1937

2,096,338

UNITED STATES PATENT OFFICE 2,096,338

METHOD AND APPARATUS FOR BLOWING SPONGE RUBBER

Chester J. Randall, Naugatuck, Conn., assignor to United States Rubber Company, New York, N. Y., a corporation of New Jersey Application February 6, 1935, Serial No. 5,209

13 Claims. (Cl. 18—6)

This invention relates to an improved method and apparatus for making sponge rubber and more particularly for making sponge rubber in continuous sheets.

In the manufacture of sponge rubber a gas forming or blowing agent is mixed with the raw rubber stock and when the stock is heated while it is being cured, small bubbles of gas are formed therein which expand or blow the stock and make it spongy. Heretofore in accordance with the usual practice, the raw stock has been blown in situ in a metallic mold having a fixed volume and as the length of the mold is limited, very long or continuous sheets of rubber cannot be made in that manner.

When the stock is blown in a mold having a fixed volume the mold is partially filled with the raw stock to leave room for the expansion of cured rubber, and upon heating the stock it expands to fill the mold and form the article of the desired shape. Due to the fact that the mold is only partially filled upon the beginning of the expansion of the rubber, no pressure is applied to its top surface and an excess of gas sometimes accumulates near that surface and causes blisters in that portion of rubber.

A further disadvantage is encountered in blowing rubber in direct contact with the metal of the mold. As the metal is impervious to the blowing gases, it prevents them from escaping from the surfaces of the rubber in contact therewith, particularly the bottom and sides of the stock, and causes a skin of dense rubber to be formed on such surfaces of the blown rubber.

It has been proposed to blow sponge rubber by placing the raw stock between strips of fabric of a limited length and pull the strips containing the stock through a heated zone. In that manner it was possible to eliminate the dense skin on the cured rubber by providing a means for the escape of surface gases through the fabric but as the length of the strips of fabric was limited so were the cured sheets of rubber. Furthermore, as the volume of the heating zone was constant, it was necessary to provide a free space for the stock to expand into upon being blown. At the beginning of the blow no pressure was applied to the top surface of the stock and blisters were sometimes formed in the rubber while the stock was expanding to fill the mold.

In accordance with this invention the above difficulties in blowing sponge rubber are obviated and an improved method and apparatus have been provided for blowing sponge rubber in continuous sheets in which the raw sponge rubber stock is placed between two endless conveyors of porous material, preferably of fabric, travelling at the same speed between heated platens. The platens are so arranged that they press the conveyors into contact with the sponge stock with regulatable pressure. At least one set of the platens and conveyors is adapted to yield to the expansion of the rubber. In this manner a sheet of rubber of indefinite length may be continuously carried between the platens while the desired pressure is applied to the surfaces of the sponge stock while it is being blown and vulcanized. Since the top and bottom surfaces of the raw stock is in continuous contact with the heated conveyors and the desired pressure is applied to the top surface of the stock, the rubber is efficiently blown and blisters are prevented. The porosity of the fabric conveyors allows escape of the gas formed during the blowing action and thereby produces sponge rubber of uniform density and eliminates the dense skin of rubber which is formed by the usual practice where the sponge rubber is blown in contact with metal.

The above advantages and important features of this invention will be understood by referring to the following description and the accompanying drawings, in which:

Figure 1 is a plan view of the entire apparatus showing feed rolls from which the supply of raw sponge rubber may be supplied to the machine;

Fig. 2 is a side elevation of the entire apparatus shown in Fig. 1;

Figs. 3 and 4, respectively, are enlarged plan and side elevational views of a portion of the apparatus as shown in Figs. 1 and 2, the supply feed rolls and a portion of the conveyor belts being omitted;

Fig. 5 is a cross section taken on line 5—5 of Fig. 3;

Fig. 6 is a lateral cross section through a portion of the platens;

Fig. 7 is an enlarged view of the portion of the cross section in Fig. 6 showing the sponge stock between the conveyor belts on an enlarged scale; and Fig. 8 is a cross section of a portion of a sheet of material containing a lamination of sponge stock to be blown in accordance with this invention.

Referring to Figs. 1 and 2 of the drawings, the raw sponge rubber stock is supplied from a pair of stock reels 10 positioned at the head of the apparatus, but it will be understood that the stock may be supplied directly from a calender or other source. The raw stock being tacky, the convolutions of the stock on the reels 10 are separated from and are prevented from sticking to one another by a non-tacky backing material which may be made a component part of the sheet of rubber 11 shown in enlarged detail in Fig. 8. Preferably two sheets 11 of the material are vulcanized and blown at the same time by unwinding a sheet from each reel 10 with the non-tacky material back to back. The sheets 11 are fed in that relationship to a bottom conveyor 12 which transports the two superimposed sheets to and underneath a top conveyor 13. The sheets of material 11 positioned between the conveyors 12, 13 are carried thereby between a top platen 14 and a bottom platen 15. Both of the platens are heated and the top platen 14 is adapted to yieldably ride upon the top conveyor 13 and hold it with a regulatable pressure against the sheet material 11. When the machine is operating upon the sponge rubber, the heating chamber containing the rubber between the conveyors increases in cross sectional area in the direction of movement of the conveyors therein to take care of the expansion of the rubber. The increase in the cross sectional area of the heating chamber may be produced by the expansion of the sponge rubber or the distance between the platens may be initially greater towards the rear to provide for such increase.

The supply rolls 10 are rotatably mounted on a frame A having a pair of end posts 16 which supports the front end of the conveyors 12 and 13.

The platens 14 and 15 are supported on a frame B having a front pair of end posts 22 and a rear pair of end posts 23 on which are journalled driving rolls 17, 18, 19 and 20 from which the conveyors 12 and 13 are driven. The pairs of end posts 22 and 23 are braced cross-wise at the top and bottom by braces 24 and lengthwise by top and bottom side sills 25 and 26. The top side sills 25 include a long member 25a secured to the end posts 22 and 23 and a short member 25b. One of the side sills 25 is supported intermediate its ends by short stakes 27 and the other side sill 25 is supported by divided tall side stakes 28 upon which the top platen 14 is yieldably carried as will be hereinafter explained.

The bottom platen 15 is carried by a subframe comprising cross supports 29 resting upon the side sills 25. A pair of longitudinal interiorly disposed beams 30 rest upon the cross supports 29 and support the platen 15, which is secured thereto by clamps 31 and screws 32 (Fig. 6).

Preferably the top platen 14 is made in a plurality of sections 14a, 14b, 14c and 14d so that a different pressure may be applied to conveyor 13 at different points. As shown in Fig. 5, each section is independently mounted on the tall side stakes 28 and the pressure exerted by each on the conveyor 13 is controlled by balancing devices each comprising a bell crank lever 33 pivoted on a pin 34 at its elbow within the space at the top of the tall side stakes 28. One arm 35 of the bell crank lever 33 overhangs the sections of the top platen 14 and is pivoted thereto on a stub shaft 36 journaled in a bracket 37 secured to the platen. The other arm 38 of the bell crank lever 33 extends downwardly within the space in the divided tall side stake 28 to the bottom of the machine and is resiliently pressed inwardly by a coiled spring 39 which is held under compression between a shoulder 40 on the frame of the machine and a head 41 on a rod 42 which extends through the spring and the shoulder on the frame and a bore in the lower end of the bell crank arm 38. The end of the rod 42 extending through the arm 38 is provided with a nut 43 threaded thereon which holds the rod 42 in cooperative relation with the end of the bell crank arm 38.

There are times when it is necessary to lift the top platen 14 to permit the conveyors 12 and 13 to be changed or to be lifted for other reasons and for this purpose a lifting device is provided for each section of the platen. The lifting device comprises a plurality of air cylinders 44 which are pivoted at one end on a pin 45 to a bracket 46 secured to the frame of the machine (Fig. 5). A piston rod 47 secured to a piston in each cylinder 44 is attached to the lower end of the downwardly extending arm 38 of each bell crank lever 33. Each of the cylinders 44 is connected to an air line 48 which may be suitably controlled by a common valve (not shown) for simultaneously admitting and discharging air to and from each of the cylinders and thereby cause the piston rods 47 to pull the arm 38 of the bell crank levers 33 inwardly, as viewed in Fig. 5, and move each section of the top platen and the bell crank levers to the position indicated by the dot and dash lines.

In order to maintain a predetermined minimum space between the adjacent surfaces of the platens 14 and 15, a stop in the form of a set screw 49 is provided for each section (Fig. 6). The set screws 49 are threaded through an extension on the top platen 14 and are provided with a reduced portion 50 which extends into a slot 51 in a corresponding extension 52 on the bottom platen 15. A shoulder 53 is provided on the screws 49 at the junction between the reduced portion of the set screws and threads. The shoulder 53 rests upon the top surface of the extension 52 on the bottom platen and maintains the adjacent surfaces of the platens at a predetermined distance from one another in order to assist in controlling a minimum thickness of the sponge rubber held between the conveyors 12 and 13. The reduced portion 50 of the set screw cooperating with the sides of the slot 51 in the extension 52 on the bottom platen 15 maintains the sections of the top platen in longitudinal alignment with the bottom platen and at the same time permits the top platen to move up and down with respect to the bottom platen.

The platens 14 and 15 are heated by any suitable medium. Preferably they are heated by steam. As shown in Fig. 6, passages 54 are provided in each of the platens for the circulation of steam therethrough. Referring to Figs. 3 and 5, the steam is admitted to the top and bottom platens 14 and 15 respectively through inlet hoses 55 connected to the first section of each platen. The sections of the top platen 14 are each connected by a hose connection 56 extending from one to the other and the sections of the bottom platen 15 are similarly connected. In this manner the steam is circulated through each section of the platens 14 and 15 and is exhausted from the respective top and bottom rear platens through steam outlets 57. The supply of steam to the inlet hoses 55 may be suitably controlled by valves, not shown. Heat insulating material 58 (Fig. 6), such as asbestos, is applied to the outside surfaces of the platens to prevent heat losses.

The conveyors 12 and 13 are made of pervious material in order to permit the escape of the blowing gases from the sponge rubber sheet 11. Preferably the conveyors 12 and 13 are made of cotton fabric. The top conveyor 13 upon emerging from between the upper and lower platens 14 and 15 passes around the driving roll 18 keyed to a shaft 59 journaled on posts 23. The conveyor 13 passes around the roll 18 and over an idler roll 60. From the idler roll 60 the conveyor 13 passes upwardly over the driving roll 17 affixed to a shaft 61 journalled to the tops of the end posts 23. The top of the conveyor 13 extends to the head section A of the machine and around roll 62 journalled in the brackets 63 on posts 16. The conveyor 13 then passes backward over a roll 64 journaled in brackets 65 on the posts 22, and from this roll the conveyor 13 extends downwardly around a roll 66 adapted to take up slack in the conveyor 13 and upwardly over a roll 67 journalled in the brackets 65. From the latter roll 67 the conveyor 13 extends downwardly and underneath a roll 68 journaled between the forward posts 22 of the section B of the machine. This roll 68 has its lower circumference positioned substantially opposite the heating chamber between the platens in order to guide the conveyor 13 into the chamber.

The bottom conveyor 12 upon emerging from the space between the platens 14 and 15 passes over the driving roll 19 which is secured to a shaft 69 journalled on the posts 23 of the machine. The conveyor 12 then passes around the driving roll 19 and over an idler roll 70, then downwardly around the driving roll 20 which is fixed to a shaft 71. The bottom side of the bottom conveyor 12 then passes to the head of the machine and over a roll 72 journalled in brackets 73 affixed to the forward pair of posts 22 and then passes downwardly and underneath a floating take-up roll 74 and upwardly over a roll 75 journalled in the same brackets 73. From this position the conveyor 12 extends around a roll 76 journalled in brackets 77 on posts 16 of front section A of the machine which carries the supply rolls 10 of rubber and from the latter roll 76 the conveyor 12 passes backward over a table 78 to the space between the platens 14 and 15. When it is desired to remove the conveyors 12 and 13 or to release tension therein, the slack take-up rolls 66 and 74 for both the bottom and top conveyors 12 and 13 may be raised and held in the raised position by hooks 79 which support the projecting end of the shafts to which these rolls are affixed.

The upper and the lower conveyors 13, 12 are driven at the same speed by a motor 80 which drives a belt 81 which in turn drives a transmission gear mechanism 82 (Figs. 3 and 4). A sprocket 83 of the gear mechanism 82 drives a sprocket chain 84 which in turn drives a large sprocket 85 fixed to a sleeve 86 journalled on the shaft 71 to which the lower driving roll 20 of the bottom conveyor 12 is fixed. A smaller sprocket 87 is fixed to the sleeve 86 and drives a chain 88 which meshes with an idler sprocket 89, and sprockets 90, 91 fixed, respectively, to the shafts 59, 69 of the adjacent driving rolls 18, 19. The upper driving roll 17 of the upper conveyor 13 and the lower driving roll 20 of the lower conveyor 12 are respectively driven by sprockets 92, 92' fixed respectively to the shafts 59 and 69 which drive chains 93, 94 meshing respectively with sprockets 95, 96 fixed to the shaft 61 and 71 respectively.

A cross section of a sheet of laminated material particularly suitable for making inner soles for shoes is shown in Fig. 8, which has been prepared for treatment in accordance with this invention. The sheet comprises a bottom layer of semi-cured impervious gum rubber stock 97 cemented to an intermediate layer of rag stock 98 which in turn is cemented to a top layer of raw sponge rubber stock 99.

In the operation of this apparatus for the treatment of the above material, the laminated sheets 11 of such material are wound upon reels 10 with the layer of impervious gum stock 97 forming the outer convolutions of the material on the reel. Since the impervious gum stock is semi-cured, it does not adhere to the tacky raw sponge stock material in contact therewith. But it will be obvious that other methods may be used for preventing the convolutions of the sheet material from adhering to one another. The sheet material 11 is unwound from the reels 10 simultaneously so that the non-tacky gum stock 97 on the respective sheets is positioned in a back to back relation to each other as shown in Fig. 7. The conveyors 12 and 13 having been set in motion by the driving motor 80, each of the sheets 11 is fed in the above relationship on to the bottom conveyor 12 and is conveyed thereby between it and the top conveyor 13 through the heating chamber formed between the top and bottom platens 14 and 15. The sections 14a, 14b, 14c and 14d ride upon the top conveyor 13 and force it with a regulatable pressure in contact with the raw sponge stock 99. The pressure exerted by each of these sections upon the conveyor 13 increases progressively in the direction of travel of the sponge stock material that is being blown by the heat transmitted through the conveyors from the heating platens 14 and 15. As the sponge stock is soft and may be easily deformed, the forward section 14a rides comparatively light upon the conveyor 13 so that the material will not be deformed but with enough pressure on the sponge stock to efficiently transmit the heat to the stock and also prevent blisters from being formed on the top surface which may result as a lack of pressure. The last section 14d is caused to ride upon the conveyor 13 with sufficient pressure to hold the sponge stock that is being blown to the proper gauge but the pressure exerted by any one section is insufficient to cause the rubber to impregnate the conveyors. As the sponge stock travels between the conveyors, the pressure exerted by the sections of the platens on the stock increases progressively in the direction of travel of the stock, and all of the sections of the platen 14 are adapted to yield under the blowing action of the sponge rubber and thereby provide a heating chamber having a cross sectional area which increases in the direction of travel of the stock. The conveyors being made of the porous fabric material, they permit the blowing gases to escape and prevent the formation of a dense skin on the surface of the blown stock. As the blown and cured sheet material 11 passes from the conveyors 12 and 13 at the rear driving rolls 18 and 19, it may be wound upon reels (not shown) and stored for use.

While this invention has been described particularly with reference to blowing and curing sponge stock in a laminated sheet, it will be understood that sheets of raw sponge stock may be fed to the conveyor belts 12 and 13 and blown and cured in a continuous homogeneous sheet in the same manner as the laminated sheets 11. It will also be understood that other modifications and details of this invention may be made without departing from the scope of the appended claims.

Having thus described my invention what I claim and desire to protect by Letters Patent is:

1. The method of blowing sponge rubber comprising the steps of inserting sponge stock between opposed surfaces, exerting progressively increasing pressure on the sponge stock by the opposed surfaces, heating the stock, and expanding the volume of the stock in the direction of lines normal to the surfaces while in contact therewith.

2. The method of blowing sponge rubber comprising the steps of inserting sponge stock between opposed surfaces, one of which is yieldable, transmitting pressure from the yieldable surface to the stock, heating the stock, and expanding it in the direction of the yieldable surface while progressively increasing the pressure on the stock.

3. The method of blowing sponge rubber comprising the steps of continuously passing sponge rubber stock between heated surfaces movable away from one another; heating the stock during its travel for a sufficient period to blow the rubber, and thereby move one of the surfaces away from the other.

4. The method of blowing sponge rubber comprising inserting unblown sponge rubber stock between strips of fabric, drawing said strips between heated surfaces, and blowing said stock while substantially the entire area of the opposite surfaces of said strips between said heated surfaces are respectively maintained in contact with the stock and the heated surfaces during the travel of the strips between the surfaces.

5. The method of blowing sponge rubber comprising the steps of inserting sponge stock between strips of fabric, drawing the strips between heated surfaces, transmitting pressure from the heated surfaces to the stock and continuously expanding the stock under the pressure of the heated surfaces in the direction of the distance between the heated surfaces while the strips remain substantially continuously in contact with the heated surfaces.

6. The method of blowing sponge rubber comprising the steps of inserting sponge stock between strips of fabric, drawing the strips between heated surfaces, transmitting a progressively increasing pressure from the heated surfaces to the stock, and continuously expanding the stock under the pressure of the heated surfaces in the direction of the distance between the heated surfaces while the strips remain substantially continuously in contact with the heated surfaces.

7. The method of making continuous composite sheets having a lamination of sponge rubber, comprising the steps of forming a composite sheet containing a lamination of raw sponge rubber stock and a layer of uncured dense rubber stock; inserting the composite laminated sheet between two conveyors, one of the conveyors being adjacent to the sponge stock and being adapted to permit the escape of the blowing gases from the surface of the sponge stock, drawing the conveyors and the stock therebetween through a heated zone, and applying a light pressure by the conveyors to the stock during the entire passage through the heated zone.

8. The method of making continuous composite sheets having a lamination of sponge rubber comprising the steps of forming composite sheets containing a lamination of raw sponge rubber stock and a layer of partially cured dense rubber stock, inserting two of the composite sheets between two conveyors with the laminations of dense stock back to back, drawing the conveyors and the stock therebetween through a heated zone, and applying a light pressure to the stock while passing through the heated zone.

9. A sponge rubber blowing machine comprising a heating chamber having a movable heating surface, means for yieldably supporting said surface so that it is movable in response to the blowing pressure of the sponge rubber during the operation of the machine.

10. A sponge rubber blowing machine comprising a heating chamber, means for drawing sponge rubber stock through said chamber, and said chamber having a cross-sectional area which increases in the direction of the movement of said drawing means.

11. A sponge rubber blowing machine comprising a heating chamber, means for drawing sponge stock through said chamber, said chamber having a movable wall floating upon said drawing means and adapted to exert pressure upon the sponge stock as it is drawn through the heating chamber, and means for regulating said pressure.

12. A sponge rubber blowing machine comprising a pair of heating platens forming a heating chamber therebetween, means for yieldably supporting one of said platens in respect to the other so that said yieldably supported platen will yield in response to the blowing pressure of the sponge rubber during the normal operation of the machine, a pair of fabric conveyors extending between and in substantially continuous contact with the opposed surfaces of said platens for conveying sponge rubber stock therebetween and through the heating chamber.

13. A sponge rubber blowing machine comprising a pair of heating platens, one of said platens being made in sections and forming with the other platen a heating chamber therebetween, means for yieldably supporting said sectional platen, a pair of endless fabric conveyors extending between said platens for conveying sponge rubber stock therebetween and through the heating chamber, said platens being adapted to exert pressure on said conveyors, and means for varying the pressure exerted by each section of the sectional platen.

CHESTER J. RANDALL.